United States Patent [19]
Magrini

[11] 3,910,371
[45] Oct. 7, 1975

[54] INSTRUMENT PANEL FOR MOTOR VEHICLES

[75] Inventor: Guido Magrini, Brescia, Italy

[73] Assignee: Fiat Societa per Azioni, Turin, Italy

[22] Filed: July 31, 1973

[21] Appl. No.: 384,346

[30] Foreign Application Priority Data
Aug. 29, 1972  Italy.................................. 69767/72

[52] U.S. Cl. ................................................ 180/90
[51] Int. Cl.² ........................................ B60K 20/08
[58] Field of Search......... 180/89 R, 90, 77 R, 77 S; 296/74; 248/27

[56] References Cited
UNITED STATES PATENTS
1,677,279   7/1928   Ford ..................................... 180/90
1,835,456  12/1931   Bernard et al......................... 180/90
2,571,627  10/1951   Sloman................................. 180/90
3,053,337   9/1962   Prohasha............................... 180/90
3,302,743   2/1967   Mosquera............................. 180/90

*Primary Examiner*—Robert B. Reeves
*Assistant Examiner*—Larry H. Martin
*Attorney, Agent, or Firm*—Sughrue, Rothwell, Mion, Zinn & Macpeak

[57] ABSTRACT

An instrument panel for a motor vehicle has a hooded instrument housing which is pivotally mounted in a recess in the front wall of the driver's cab, in front of the steering wheel, for pivotal movement about a horizontal transverse axis from its normal position of use into a raised position affording easy access to the rear of the mounted instruments.

4 Claims, 5 Drawing Figures

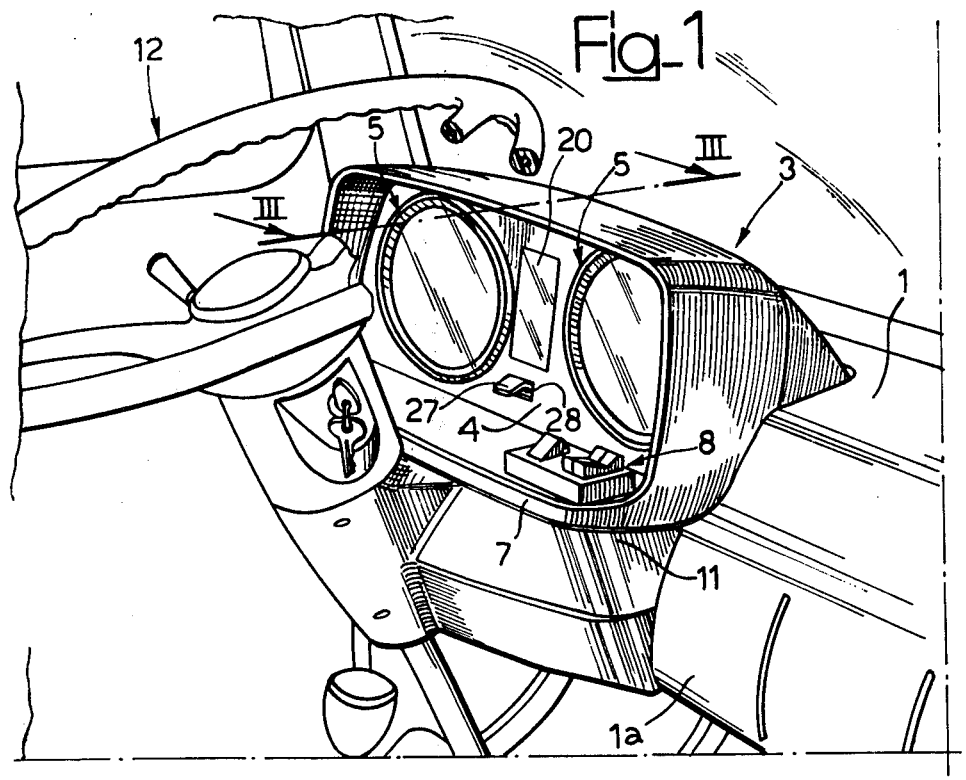
Fig_1
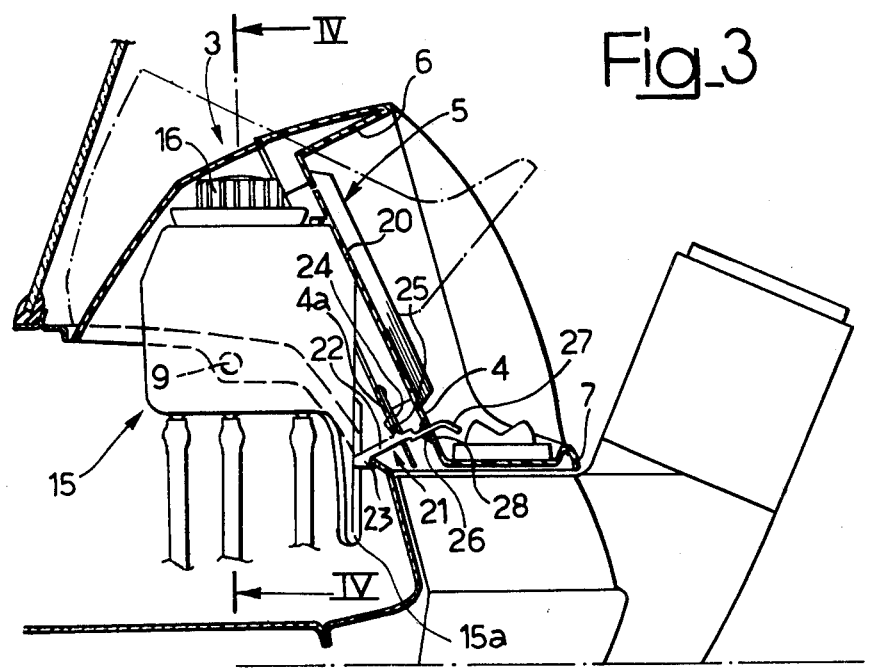
Fig_3

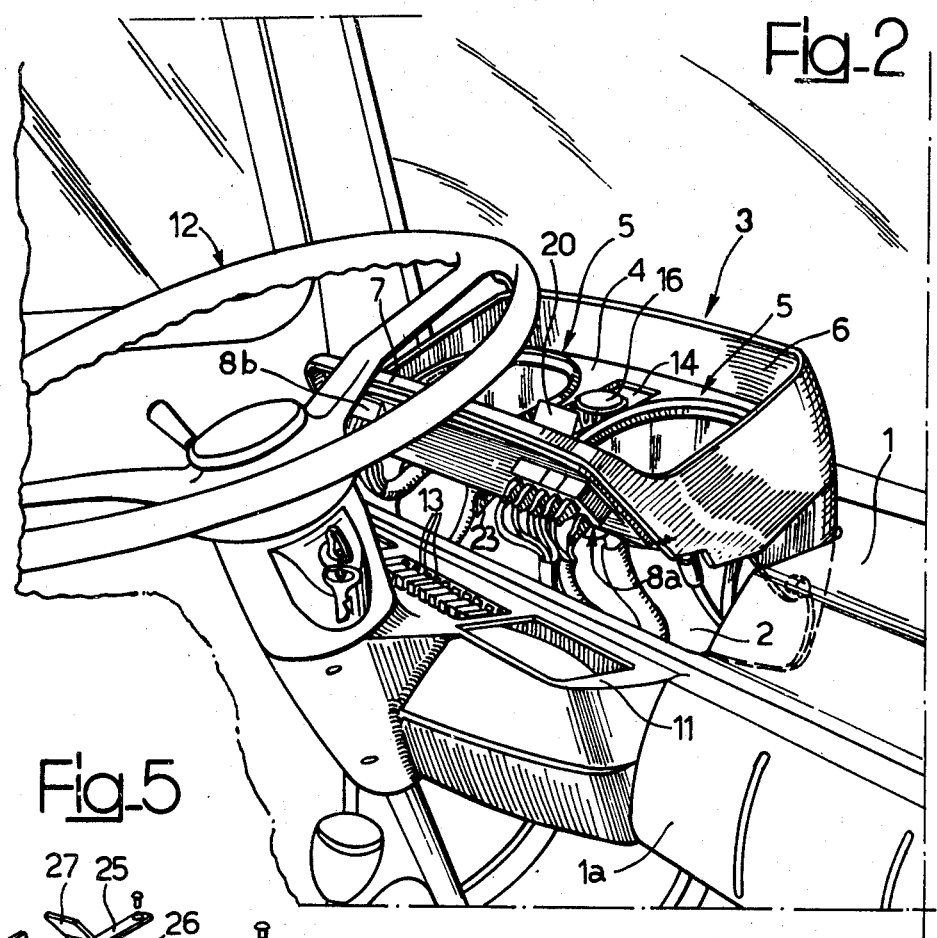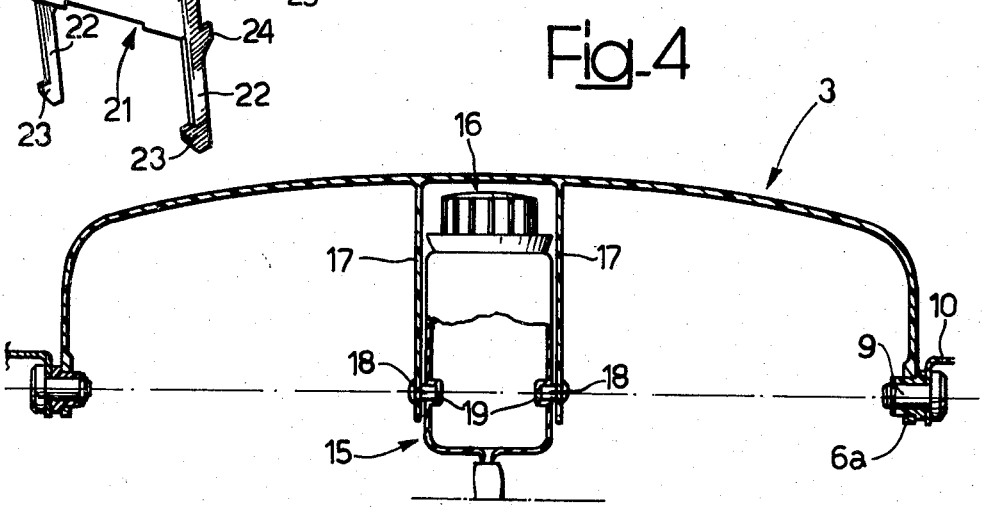

INSTRUMENT PANEL FOR MOTOR VEHICLES

This instrument relates to instrument panels for motor vehicles, with particular reference to instrument panels comprising a support housing provided with a base wall on which the instruments are mounted, surrounded by a peripheral hood which prevents reflection of extraneous light from the glass faceplates of the instruments.

In general, hooded instrument panels of the above-mentioned type are attached to the front wall of the driver's cab between the wheel and the windscreen. By mounting such instrument panels independently of the front wall of the cab the fitting of the instruments is facilitated, since they can be mounted in advance on the panel before the latter is fitted to the vehicle.

Once fitted, however, such panels can only be removed by laborious and complicated operations. Consequently access to the instruments is always very limited and there is, moreover, no easy access to the connections between the instruments and the respective electrical cables, and the connection between the flexible shaft of the speedometer and the speedometer itself.

An object of the present invention is to obviate such disadvantages by providing an instrument panel of the above-mentioned type which is of simple and strong construction and easy and convenient to mount, and which allows the greatest possible accessibility to the rear of the instrument panel for repair or maintenance work or for replacement of parts.

Another object of a preferred embodiment of the invention is to provide an instrument panel of the above-mentioned type which enables installation of the hydraulic fluid reservoir for the braking and/or clutch control systems in a position in which the fluid level can be constantly observed and in which it is possible to effect filling or replenishment of the reservoir without dismantling the instrument panel from the vehicle.

According to the present invention there is provided an instrument panel for motor vehicles, of the type comprising a support housing having a base wall adapted to support a plurality of instruments and a peripheral hood which surrounds the base wall and projects from it so as to screen the instruments from extraneous light, characterised in that the support housing is mounted in a recess in the front wall of the driver's cab for pivotal movement about an axis extending transversely of the vehicle so as to be movable from a lowered normal position of use to a raised position giving access to the rear of the instruments and the respective connections thereto.

Preferably the base wall has a central aperture behind which is situated a fixed reservoir with transparent or translucent walls for containing hydraulic fluid for the vehicle braking and/or clutch control system, so that it is possible for the driver to keep the fluid level in the reservoir under constant supervision.

The invention will now be described, by way of non-restrictive example, with reference to the accompanying drawings, in which:

FIG. 1 is a perspective view of an instrument panel according to one embodiment of the invention, illustrated in the normal mounted position; FIG. 2 is a perspective view similar to FIG. 1, showing the panel in the raised position for access to the rear of the panel;

FIG. 3 is a transverse section of the panel on an enlarged scale, taken along the line III—III of FIG. 1.

FIG. 4 is a longitudinal section of the panel, taken along the line IV—IV of FIG. 3, and FIG. 5 is a perspective view of a detail of FIG. 3.

Referring to the drawings, reference numeral 1 indicates a front transverse wall of the driver's cab of a vehicle, situated in proximity to the vehicle windscreen, the top part of which wall normally supports the instrument panel.

The front wall 1 is formed with a recess 2 directly in front of the front wall 1 and an instrument panel according to the present invention is mounted in the recess 2. The panel has a support housing 3 comprising a base wall 4 which is adapted to support a plurality of known instruments 5 and a peripheral hood 6 which surrounds the base wall 4 and extends towards the driver so as to screen the instruments against extraneous light which could be reflected in the glass faceplates of the instruments and obscure the driver's view of the instruments.

The hood 6 has a lower wall 7 which extends further towards the driver than the rest of the hood 6, providing a support for one or more switches 8 or other electrical components, and associated electrical connectors 8a, 8b.

As shown in FIG. 4 the instrument panel housing 3 is pivoted about an axis extending transversely of the vehicle and defined by two horizontal pivot pins 9, aligned with the said transverse axis and supported by fixed elements of the vehicle bodywork 10, the pins 9 being rotatably engaged in respective appendages 6a of the lateral walls of the hood 6. The support housing 3 can be rotated about the said transverse axis between a normal working position, depicted in FIG. 1, in which the instruments are arranged facing the driver, and a raised or upwardly inclined position, see FIG. 2, in which the rear parts of the instruments and the associated groups of connectors 8a, 8b are accessible.

The lower wall 7 of the hood 6 cooperates, in the closed position (FIG. 1), with a moulded appendage 11, applied to the lower part 1a of the front wall 1 of the cab and extending towards the steering wheel to form a housing adapted to receive parts of electrical components of the electrical instruments, switches and the like. In the example shown, the appendage 11 has moulded spaces which receive the groups of connectors 8a, 8b, and a central space in which are housed fuses 13 connected in the various electrical circuits associated with the vehicle electrical system. In the closed position of the instrument panel housing 3 the fuses 13 are protected, whilst in the raised position of the panel housing they are readily accessible.

In the central part of the base wall 4 of the instrument panel housing 3 there is provided a rectangular aperture 14 behind which is mounted a reservoir 15, of transparent or translucent material, for the hydraulic fluid of the braking system and/or for the clutch control of the vehicle. The reservoir 15 has a filler cap 16 which is accessible through the aperture 14 in the raised position of the panel. The reservoir 15 is supported within the housing 3 by two pliant arms 17 integral with the housing and provided with respective pivot pins 18 situated upon the same axis as the pivot axis of the panel, defined by the pivot pins 9. The pivot pins 18 are engaged in sockets 19 formed in the wall of the reservoir 15. The reservoir 15 is connected to the supply and delivery tubing and retained in a fixed position by a handle 15a, so that movements of the instrument panel housing 3 about its pivot axis are not transmitted to the reservoir 15. To the part of the reservoir 15 facing the aperture 14, there is fitted a transparent window 20 which, in the lowered position of the instrument panel (FIG. 1) closes the aperture 14. By observing the reservoir 15 through the window 20 the driver can keep a continuous check on the fluid level in the container. When, on the other hand, the panel is raised (FIG. 2), the aperture 14 is located about the filler cap 16 to give the driver access to the latter for replenishment of the fluid in the reservoir 15.

The instrument panel is held in the normal position of use by externally releasable locking means. In the example illustrated the locking means are constituted by a retaining device 21 (FIG. 5) comprising a plate with two arms 22 which fit into orifices carried by a rear wall 4a of the instrument panel housing 3, parallel to and spaced from the base wall 4, the arms 22 being provided at their inner ends with hooks 23 which cooperate with a fixed retaining plate integral with the front wall 1 of the cab. Each of the arms 22 also has a respective heel 24 upon which a respective spring strip 25 acts to keep the arm 22 in a lowered position of use in which the hooks 23 are engaged behind the fixed retaining plate as shown in FIG. 3. The retaining device 21 is also formed with a moulded head 26 in which a metal lever 27 is inserted. The lever 27 projects through a slot 28 made in the base wall 4 of the instrument panel. By manually pressing on the lever 27 the hooked arms 22 are rocked, in a clockwise direction as viewed in FIG. 3, to disengage the hooks 23 from the fixed retaining plate and free the panel 3 for lifting into its raised position.

In the raised position of the panel, all the electric cables connected to the instruments are accessible, and access to the flexible drive shaft of the speedometer is also facilitated.

It will be understood that details of practical embodiments of this invention may be varied widely from what has been described and illustrated, without thereby departing from the scope of this invention.

I claim:

1. Instrument panel for motor vehicles of the type having a front wall extending across the width of the driver's cab and means for pivoting an instrument panel in a recess in said wall about an axis extending transversely of the vehicle behind the steering wheel, said instrument panel comprising a support housing having a base wall adapted to support a plurality of instruments having respective rear connections and a peripheral hood which surrounds the base wall and projects from it so as to screen the instruments from extraneous light, said housing being movable from a lowered normal position of use to a raised position giving access to the rear of the instruments and the respective connections thereto, said peripheral hood having a lower wall which projects towards the inside of the cab further than the remainder of the hood in the normal position of use of the panel, and said lower wall constituting a support for further instruments or electrical components which are not placed on said base wall.

2. Instrument panel as defined in claim 1, wherein the lower wall of the hood cooperates, in the lowered position of use of the panel, with a lower moulded appendage applied to the front wall of the cab and enclosing at least one space in which are housed other electrical components, such space being closed by the lower wall of the instrument panel hood in the lowered position of the panel housing.

3. Instrument panel for motor vehicles of the type having a front wall extending across the width of the driver's cab and means for pivoting an instrument panel in a recess in said wall about an axis extending transversely of the vehicle behind the steering wheel, said instrument panel comprising a support housing having a base wall adapted to support a plurality of instruments having respective rear connections and a peripheral hood which surrounds the base wall and projects from it so as to screen the instruments from extraneous light, said housing being movable from a lowered normal position of use to a raised position giving access to the rear of the instruments and the respective connections thereto, said wall having means defining a central aperture therein and including a fixed reservoir behind said aperture, said reservoir having light-transmitting walls and being adapted to contain hydraulic fluid for at least the vehicle braking system, whereby it is possible for the driver to keep the fluid level in the reservoir under constant supervision, said reservoir having a filler cap and a transparent window mounted thereon which closes the aperture in the base wall in the lowered position of use of the panel with the aperture being so dimensioned that, in the raised position of the panel, the filler cap of the reservoir is accessible through the aperture.

4. Instrument panel for motor vehicles of the type having a front wall extending across the width of the driver's cab and means for pivoting an instrument panel in a recess in said wall about an axis extending transversely of the vehicle behind the steering wheel, said instrument panel comprising a support housing having a base wall adapted to support a plurality of instruments having respective rear connections and a peripheral hood which surrounds the base wall and projects from it so as to screen the instruments from extraneous light, said housing being movable from a lowered normal position of use to a raised position giving access to the rear of the instruments and the respective connections thereto, said wall having means defining a central aperture therein and including a fixed reservoir behind said aperture, said reservoir having light-transmitting walls and being adapted to contain hydraulic fluid for at least the vehicle braking system, whereby it is possible for the driver to keep the fluid level in the reservoir under constant supervision, said panel housing having pliant arms formed integrally with said housing, said arms pivotally supporting the reservoir for pivotal movement about an axis coinciding with the axis of oscillation of the panel housing.

* * * * *